UNITED STATES PATENT OFFICE.

ADOLPH MIETHE, OF CHARLOTTENBURG, AND ARTHUR TRAUBE, OF BERLIN, GERMANY.

PANCHROMATIC DRY-PLATE AND PROCESS OF MAKING SAME.

SPECIFICATION forming part of Letters Patent No. 724,311, dated March 31, 1903.

Application filed December 6, 1902. Serial No. 134,193. (No specimens.)

*To all whom it may concern:*

Be it known that we, ADOLPH MIETHE, residing at Charlottenburg, and ARTHUR TRAUBE, residing at Berlin, in the German Empire, citizens of the German Empire, have invented certain new and useful Improvements in Panchromatic Dry-Plates and Processes of Manufacturing the Same; and we do hereby declare the following to be a full, clear, and exact description of the invention, such as will enable others skilled in the art to which it appertains to make and use the same.

Up to the present date the preparation of panchromatic plates has always been effected by employing a mixture of several dyes whose sensitizing powers supplemented one another. The sensitizing of plates for orange was usually attained in such a mixture by the addition of cyanin, a body first employed by Vogel. Cyanin is a dye of unknown constitution. It is prepared by the reaction of amyl iodid upon a mixture of quinolin and lepidin and subsequent treatment of the product thus obtained with caustic potash. This body, which is completely insoluble in water, dissolves in alcohol to a deep-blue solution and has the power of sufficiently sensitizing silver-bromid plates for orange. The preparation of durable flawless plates, however, with the use of this dye is as yet attended with great difficulties, chiefly because of its great insolubility in water and of the difficulty of preparing it in a pure state.

The present invention intends to afford by the introduction of a new class of dyes a substitute for cyanin or mixtures of cyanin with other dyes in the manufacture of isochromatic dry-plates. These dyes, which have as yet not found use for this purpose, are of red color, contain the bases quinolin and quinaldin, and are remarkable for their absorption-spectrum. Whereas cyanin possesses an absorption-band at 595.7, the quinolin-quinaldin dyes in question exhibit two strong absorption-bands, which in concentrated solutions are of nearly equal intensity and fall the one in the green, the other in the orange of the spectrum. The position of the bands is slightly different according as different alkyl iodids are used, the more intense of the two lying between 553 and 558, the other between 512 and 520. These spectroscopic peculiarities are of great importance in the sensitizing of dry-plates with these dyes, inasmuch as the sensitizing power extends without interruption over the part of the spectrum containing the less refrangible colors. The degree of sensitiveness is practically constant in this part of the spectrum, without appreciably showing the corresponding maxima of sensitizing power of the dyes. In this manner by the employment of a single coloring-matter a dry-plate may be obtained whose sensitiveness extends from the extreme violet to the wave length 670 in the red. A further useful property of this class of dyes, some of which may be prepared in the chemically-pure state, consists in their ready solubility in water. This fact permits of their easily being washed out, the sensitiveness of the plate thus not being affected by the remnants of the coloring-matter, as in the use of cyanin. Further, the formation of all fog, color streaks, &c., during the sensitizing process, so common when difficultly-soluble dyes are employed, is avoided.

The following may serve as an example for the preparation of these dyes: 11.7 parts, by weight, of pure quinolin and 13.1 parts, by weight, of quinaldin are separately brought in reaction, each with 15.6 parts by weight, of ethyl iodid. They are then mixed and the mixture is boiled and the crystals which separate out are purified by recrystallization from alcohol. The products thus obtained are mixed in molecular proportions and heated in boiling alcohol, with a solution of caustic potash containing as much potassium hydrate as is necessary to bind one of the iodin atoms. The alcohol being partly evaporated, the coloring-matter crystallizes out and is purified in the usual way. In a similar manner the methylate, propylate, butylate, &c., may be prepared. For the purpose of sensitizing, the ethylate is either employed alone or mixed with one of the other derivatives mentioned. However, neither such mixtures nor the use of alkyl bromid or chlorid instead of alkyl iodid affords any additional advantage.

In the process of sensitizing the coloring-matters described are employed in the usual manner—i. e., light-sensitive matter in the form of either the silver-bromid emulsion or the prepared dry-plates is colored with a solution of the dye, whereupon the excess of the coloring-matter is washed out.

Panchromatic plates prepared according to our invention are in general treated and manipulated like ordinary dry-plates. The following special details of treatment should, however, be observed in the preparation of the negatives: In view of the high color sensitiveness of the plates the development must take place in very weak deep-red light, and it is to be recommended that the plates are inspected in red light only after the development has proceeded for some time. Moreover, in order to obtain a strong negative it is advisable to tone down or weaken the developer correspondingly. The following formulæ have been found to produce good results:

1. Hydroquinone developer: Water, one thousand cubic centimeters; sodium sulfite, forty grams; potash, sixty grams; hydroquinone, fifteen grams. This developer will keep for several weeks, and when using the same several drops of potassium-bromid solution are added to the same.

Another good developer for this purpose is:

2. Rodinal developer, prepared as follows: Rodinal solution, ten cubic centimeters; water, one hundred and twenty cubic centimeters; potassium-bromid solution, two cubic centimeters, (ten per cent. strength.)

After developing the plates must be well washed, and they are preferably fixed in a fixing-bath of the following composition: Sodium thiosulfate, (hypo,) one hundred grams; water, three hundred cubic centimeters; acetone sulfite, ten grams.

What we claim, and desire to secure by Letters Patent of the United States, is—

1. In the art of producing color-sensitive negative plates, the process which consists in treating light-sensitive matter with a dye prepared from the halogen alkylates of quinolin and quinaldin, in a manner substantially as above described.

2. In the art of producing color-sensitive negative plates, the process which consists in treating light-sensitive matter with a dye prepared from the iodin alkylates of quinolin and quinaldin, in the manner substantially as above described.

3. In the art of producing color-sensitive negative plates, the process which consists in treating light-sensitive matter with dye prepared from the iodin ethylates of quinolin and quinaldin, in the manner substantially as above described.

4. In the art of producing color-sensitive negative plates, the process which consists in treating light-sensitive silver-bromid matter with a dye prepared from the halogen alkylates of quinolin and quinaldin, in the manner substantially as above described.

5. In the art of producing color-sensitive negative plates, the process which consists in treating light-sensitive silver-bromid matter with a dye prepared from the iodin alkylates of quinolin and quinaldin, in the manner substantially as above described.

6. In the art of producing color-sensitive negative plates, the process which consists in treating light-sensitive silver-bromid matter with dye prepared from the iodin ethylates of quinolin and quinaldin, in the manner substantially as above described.

7. As a new article of manufacture, a panchromatic photographic plate, bearing a light-sensitive film combined with coloring-matter prepared from the halogen alkylates of quinolin and quinaldin.

8. As a new article of manufacture, a panchromatic photographic plate, bearing a light-sensitive film combined with coloring-matter prepared from the iodin alkylates of quinolin and quinaldin, in the manner substantially set forth.

9. As a new article of manufacture, a panchromatic photographic plate bearing a light-sensitive film combined with the described coloring-matter prepared from the iodin ethylates of quinolin and quinaldin, in the manner substantially as set forth.

10. As a new article of manufacture, a panchromatic photographic dry-plate bearing a silver-bromid film colored with a dye prepared from the halogen alkylates of quinolin and of quinaldin, in the manner substantially as set forth.

In testimony whereof we affix our signatures in presence of two witnesses.

ADOLPH MIETHE.
ARTHUR TRAUBE.

Witnesses:
HENRY HASPER,
WOLDEMAR HAUPT.